Dec. 8, 1953

L. H. JACKSON 2,661,565

ANGLER'S FLY BOX

Filed May 27, 1952

Inventor
Leonard Hatton Jackson

By Mawhinney & Mawhinney

Attorneys

Patented Dec. 8, 1953

2,661,565

UNITED STATES PATENT OFFICE 2,661,565

ANGLER'S FLY BOX

Leonard Hatton Jackson, Leamington Spa, England

Application May 27, 1952, Serial No. 290,198

4 Claims. (Cl. 43—57.5)

It is known for anglers, when fly fishing, to use compartmented boxes, each compartment having different flies from another. Whilst such a box keeps the flies separated in a very satisfactory manner, there are times when the angler may inadvertently pull out several flies instead of only one from a compartment, or when the wind may catch and remove some of the contents while the box is opened.

In another form of fly box, spring catches are provided to retain the fly hook, thus separating the individual flies from one another. In such cases the hackles are liable to be damaged, the barb of the hook is apt to be blunted or otherwise damaged during insertion or removal of the fly, and also the correct form of the fly is spoiled by being pressed against the box.

The main object of my invention is to provide an improved fly box with which these disadvantages will be obviated.

According to the invention, an angler's fly box has in it, for the support of a fly, a bar having a peripheral groove providing a reduced section of the bar to be embraced with clearance by the fly hook, whilst frictionally mounted on the bar is a sleeve-like member which can be slid axially to cause a projection of the sleeve-like member to bridge or unbridge the groove in order to retain the hook in the groove or to allow its removal therefrom respectively.

In the accompanying drawings:

Figure 4 is a section on the line 4—4 of Figure 3; and

Figure 2:
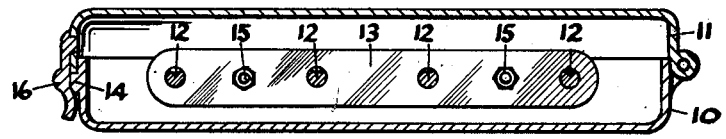
Figure 2 is a section on the line 2—2 of Figure 1.
Figure 1:
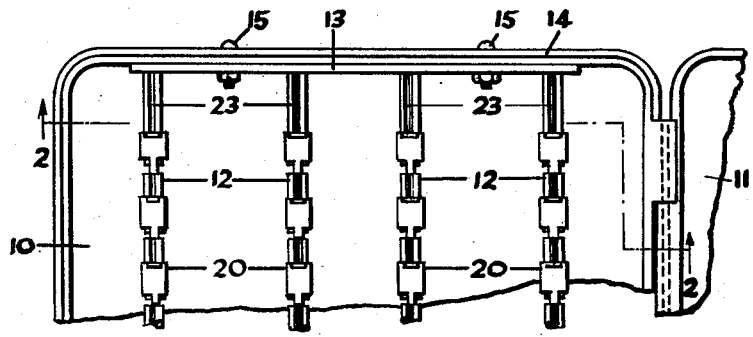
Figure 1 is a fragmentary plan of one form of box, when opened, embodying the invention.
Figure 3:
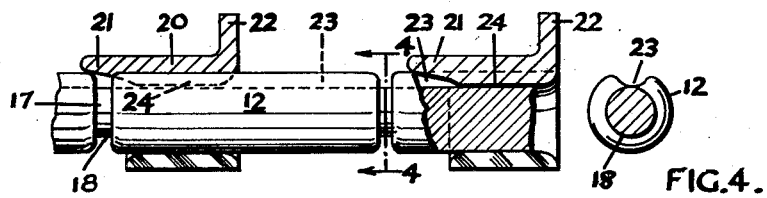
Figure 3 is an enlarged side view partially in section of one of the bars, showing one sleeve-like member in the retaining position and another slid axially out of that position.
Figure 5:
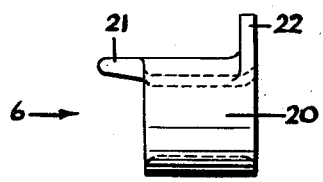
Figures 5 and 6 are side and end elevations, respectively, of one of the sleeve-like members.
Figure 6:
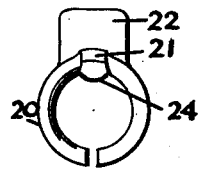

In the construction shown, the box 10 is rather flat having a hinged lid 11 of a transparent synthetic plastic material. The base or body of the box may be of like material. A grille, comprising four parallel bars 12 joined at their ends to two longitudinals 13, and preferably formed of light alloy, is mounted in the body and secured to the sides 14 thereof by means of nuts and bolts 15 or by rivets, with the bars spaced approximately mid-way of the interior height of the box when the lid is closed. The lid is held in the closed position by means of a spring or like clasp 16. Each bar may have approximately five grooves 17 equally spaced axially along each bar, the grooves being sufficiently deep relatively to a fly hook so that the latter can be engaged in a groove to embrace the bottom wall 18 of the bar 12 without the barb having any contact with the bottom wall, so as to avoid the possibility of damaging the barb.

Associated with each groove is a spring clip 20 in the form of a sleeve-like member or saddle frictionally mounted on the bar. At one end it has an axially extending projection 21, and at the other a projection 22 bent radially outwardly. The latter projection serves for engagement by the angler's finger or thumb when the sleeve or saddle is to be slid to carry the projection 21 over the groove 17, to retain the fly hook therein, or in the other direction to allow removal of the hook.

It is convenient to arrange for all the saddles to be angularly located, so that their operating projections will be in the same relative positions, and to effect this a longitudinal groove 23 may be provided along each bar to be engaged by an internal projection 24 of each saddle.

Obviously a box to take more or less than twenty flies can be made larger or smaller than that described.

What I claim as my invention and desire to secure by Letters Patent of the United States is:

1. An angler's fly box having secured to it a transverse bar with a peripheral groove of a size to be embraced with clearance by the curved portion of a fly hook, in combination with a sleeve-like member frictionally mounted on the bar for axial sliding, said member having an end projection which in one axial position of said member will bridge said groove in order to retain in said groove the curved end of any fly hook which may have been placed in said groove, whilst the fly hook can be removed in another axial position of said member in which said projection is clear of said groove.

2. An angler's fly box including a grille comprising a number of parallel bars joined at their ends to longitudinals secured to the box, the bars being spaced approximately midway of the interior height of the box, each of the bars being provided with at least one peripheral groove of a size to be embraced by the curved end of a fly hook without the bar contacting the bottom of the groove, and sleeve-like members frictionally mounted for axial sliding movement relatively to the bars for each of the said grooves, each of said members having a projection which, when said member is appropriately slid, is adapted to bridge the associated groove.

3. An angler's fly box, according to claim 1, in which the transverse bar has a longitudinal groove therein, said member having an internal projection to coact with the groove for angularly locating said member on said bar.

4. An angler's fly box, according to claim 1, in which said member has at one end an outwardly directed projection to facilitate sliding the member.

LEONARD HATTON JACKSON.

References Cited in the file of this patent

UNITED STATES PATENTS

| Number | Name | Date |
|---|---|---|
| 2,465,478 | Probst | Mar. 29, 1949 |
| 2,499,042 | Vogel | Feb. 28, 1950 |
| 2,578,181 | Edmonds | Dec. 11, 1951 |